US007556577B2

(12) United States Patent
Kita et al.

(10) Patent No.: US 7,556,577 B2
(45) Date of Patent: Jul. 7, 2009

(54) WIRE RECIPROCATING DEVICE

(75) Inventors: Shinichiro Kita, Yokohama (JP); Toku Fukaya, Yokohama (JP); Hideaki Nozawa, Nirasaki (JP); Atsushi Osada, Yokohama (JP)

(73) Assignee: OHI Seisakusho Co. Ltd. (JP)

( * ) Notice: Subject to any disclaimer, the term of this patent is extended or adjusted under 35 U.S.C. 154(b) by 647 days.

(21) Appl. No.: 11/224,898

(22) Filed: Sep. 13, 2005

(65) Prior Publication Data

US 2006/0068958 A1 Mar. 30, 2006

(30) Foreign Application Priority Data

Sep. 14, 2004 (JP) .......................... P2004-266794
Sep. 14, 2004 (JP) .......................... P2004-266795

(51) Int. Cl.
*F16H 7/14* (2006.01)

(52) U.S. Cl. ......................... 474/117; 474/135; 49/360; 296/155

(58) Field of Classification Search ................. 474/101, 474/117, 118, 135; 49/360; 296/155; 242/378, 242/388; 254/333, 383
See application file for complete search history.

(56) References Cited

U.S. PATENT DOCUMENTS 4,557,710 A * 12/1985 Greider ...................... 474/118
4,758,208 A * 7/1988 Bartos et al. ................ 474/135
5,806,246 A * 9/1998 Azuma ........................ 49/360
2003/0220164 A1* 11/2003 Tamai ........................ 474/134
2004/0003542 A1* 1/2004 Shimada et al. ............... 49/360

FOREIGN PATENT DOCUMENTS

| | | |
|---|---|---|
| DE | 196 07 552 A1 | 9/1996 |
| DE | 103 23 223 A1 | 12/2003 |
| JP | 06-137004 | 5/1994 |
| JP | 11-091355 | 4/1999 |

* cited by examiner

*Primary Examiner*—Bradley T King
*Assistant Examiner*—Nuri Altun
(74) *Attorney, Agent, or Firm*—Kilpatrick Stockton LLP

(57) ABSTRACT

A reel drum is rotatably supported on a board, and a tensioner case is detachably mounted to the board in the vicinity of the reel drum. Wires are extended from the reel drum in directions opposite to each other. A pair of tension rollers pressed onto the respective wires and roller holders rotatably supporting the respective tension rollers are attached to the tensioner case to be allowed to move in directions substantially orthogonal to the respective wires when the wires are tensioned. Moreover, the tensioner case is provided with biasing means to bias the roller holders in directions that the tension rollers are pressed onto the respective wires. The biasing means is a torsion spring. A contact portion of each roller holder which a wire end extended portion of the torsion spring is in contact with has an angle shape with a ridge aligned in a direction orthogonal to the wire end extended portion of the torsion spring.

11 Claims, 9 Drawing Sheets

WIRE RECIPROCATING DEVICE

BACKGROUND OF THE INVENTION

1. Field of the Invention

The present invention relates to a wire reciprocating device used to reciprocate a moving body, for example, such as a sliding door, a sunroof, a curtain, and a window glass of a vehicle, and specifically, relates to a biasing structure including a wire tensioner and a torsion spring.

2. Description of the Related Art

Some conventional devices to open and closed sliding door use a wire reciprocating device. In such a wire reciprocating device, a wire is wound around a pair of guide members disposed in front and rear portions of a side panel of a vehicle body. Both end portions of the wire are wound onto a reel drum in directions opposite to each other. The reel drum is attached to the side panel of the vehicle body between the both guide members. This reel drum is rotated forward and backward by driving means such as a motor to rotationally run and reciprocate the wire, so that the sliding door fixed in the middle of the wire is, reciprocated (for example, see Patent Literature 1).

In such a wire reciprocating device, while the reel drum is rotated forward or backward, a wound end portion of the wire is tensioned, and the other end portion unwound is loosened, which could cause slack. When such slack is caused, the slack portion of the wire could drop from guide means, and subsequent operations cannot be performed in some cases.

To prevent such slack, the conventional device is provided with a wire tensioner. In the wire tensioner, tension rollers are pressed onto the wire on both sides of the reel drum and biased in a direction orthogonal to the wire by means of separate tension springs.

Moreover, some conventional structures to bias the moving body by means of a torsion spring, for example, as shown in FIG. 1A, use a torsion spring 93 including a winding portion 90 and wire end extended portions 91 and 92 (for example, see Patent Literature 2). The winding portion 90 is formed by winding a center part of a wire material several times, and each of the wire end extended portions 91 and 92 is formed of an end portion of the wire extending from the winding portion 90 in the tangential direction. The winding portion 90 is fitted on the outside of a shaft 95 provided in a fixed member 94 and rotatably supported. The wire end extended portion 91 is brought into contact with an upper surface of a protruding piece 96 provided in the fixed member 94, and the other wire end extended portion 92 is brought into contact with an upper surface of a moving member 97 provided in the fixed member 94. Herein, the moving member 97 can move up and down within a rotation range thereof. The moving member 97 is thus biased downward by torsional restoring force of the winding portion 90 of the torsion spring 93.

In a lower portion of the moving member 97, a tension roller (not shown), for example, is rotatably supported. The tension roller is pressed onto a wire (not shown) configured to run rotationally and the like. The moving member 97 is thus used as a device to prevent sagging of the wire.

[Patent Literature 1] Japanese Patent Laid-open publication No. 11-91355

[Patent Literature 2] Japanese Patent Laid-open publication No. 6-137004

SUMMARY OF THE INVENTION

A first problem was that the conventional tensioner included a pair of the tension rollers and the tension springs biasing the same separately on both sides of the reel drum, which increased the number of parts as well as man-hours for assembly.

Moreover, in the conventional device, when the wire sagged more than the motion range of each tension roller, the sagging portion was sometimes disengaged from the guide means or the like, so that the subsequent operations could not be performed in some cases.

In the light of the above problem of the conventional art, an object of the present invention is to provide a wire reciprocating device which has a simple structure and is easy to mount and as well as which prevents the wire from dropping from a normal route in any case.

A second problem was that in the conventional structure to bias the moving body by the torsion spring, the upper end surface of the moving body 97, which the wire end extended portion 92 was brought into contact with, had a circular cross-section as shown in FIG. 1A or is shaped in a horizontal plane. A contact point P at which the upper end surface comes into contact with the wire end extended portion 92 therefore continually changed depending on the location of the moving body as shown in FIGS. 1A to 1C. Effective arm lengths L1, L2, and L3 changed accordingly, the effective arm lengths L1, L2, and L3 being the distance between the contact point P and a contact point Q between the winding portion 90 of the torsion spring 93 and the shaft 95, and uniform operation could not be obtained. When the upper end surface of the moving body 97, which the wire end extended portion 92 comes into contact with, was shaped in a horizontal plane, the contact point P drastically changed from a right end to a left end in the upper end surface of the moving body 97 or vice visa while the moving body 97 was moving, and the operation thereof was very unsmooth.

The wire end extended portion 92 is one wire material, and the length of the upper end surface of the moving body 97, which the wire end extended portion 92 comes into contact with, in the front-back direction (the axial direction of the shaft 95) is often larger than a diameter of the wire end extended portion 92. The wire end extended portion 92 therefore freely moves forward and backward along the upper end surface of the moving body 97, and the biasing force of the torsion spring 93 disproportionately acts on the moving body 97. There is a possibility that the biasing force becomes unbalanced or the movement of the moving body 97 becomes unsmooth.

In the light of the above conventional art, another object of the present invention is to provide a wire reciprocating device including a structure to bias the moving body by means of a torsion spring, which prevents movement of the contact point between the moving body and the wire end extended portion to allow the biasing force of the torsion spring to act on the moving body in a uniform, smooth and balanced manner.

To achieve the above object, an aspect of the present invention is a wire reciprocating device, including: a pair of guide members; a reel drum provided between the guide members; wires wound around the guide members and connected to the reel drum to be wound onto the reel drum in directions opposite to each other; a moving body connected to the wires and reciprocated by rotating the reel drum in a direction and a direction opposite thereto to rotationally run and reciprocate the wires; a pair of tension rollers pressed onto respective portions of the wires extending from the reel drum in directions opposite to each other; roller holders rotatably supporting the respective tension rollers; and a tensioner case provided in the vicinity of the reel drum. The tensioner case includes a biasing unit for biasing the roller holders in directions that the respective tension rollers are pressed onto the wires, the tensioner case allowing the tension rollers and the roller holders to move in directions substantially orthogonal to the respective wires when the wires are tensioned.

According to the aspect of the present invention, the pair of tension rollers can be easily attached to positions optimal for the reel drum only by mounting the tensioner case with the pair of tensioner rollers and the biasing means previously assembled therewith onto the board in the vicinity of the reel drum, thus facilitating assembly. Moreover, it is possible to prevent variation in the mounting positions of the both tension rollers and stably apply tension to the wires.

The tensioner case may include a tensioner body and a tensioner cover facing each other, and the tensioner body and the tensioner cover may include a pair of guide grooves extending in a direction substantially orthogonal to each wire when the wire is tensioned. The paired guide grooves may be provided in respective portions facing each other and sandwich each tension roller and each roller holder. Each of the roller holders may be fitted into the paired guide grooves so as to slide in the above direction.

According to the aforementioned configuration, a pair of the tension roller and the roller holder is sandwiched and held between the tensioner body and the tensioner cover. Accordingly, mounting the tensioner case onto the board is extremely easy, and the structure can be simplified. Moreover, the paired guide grooves are provided in the respective portions facing each other in the tensioner body and tensioner cover, and each roller holder is fitted into the grooves slidably. Accordingly, it is possible to apply tension to the wires more stably.

A space between lower edges of side portions of the tensioner body and the tensioner cover on each side of the reel drum 9 may be closed by a bottom piece extending from the lower edge of the tensioner body toward the lower edge of the tensioner cover. Moreover, gaps between the bottom piece and outer circumferences of collars on both ends of each tension roller in a state where each roller holder reaches a lowest position of the pair of guide grooves extending substantially vertically may be set smaller than diameter of the wires.

With the above configuration, even when the wires sag more than the motion ranges of the respective tension rollers, the sagging portions do not drop to the outside through the gaps between the bottom piece and collars at the both ends of each tension roller, and it is possible to eliminate the possibility of defective operation due to the disengagement of the wires.

An end portion of the bottom piece on the reel drum's side may be set in the vicinity of an outer circumferential surface of the reel drum.

With the above configuration, it is possible to surely prevent the wires from dropping from the outer circumferential surface of the reel drum in a state where no tension is applied to the wires.

In a periphery of the guide groove in an inner surface of the tensioner body, an elliptical rib surrounding the guide groove may be protruded, and a longitudinal rib reaching the bottom piece from a lower end of the elliptical rib may be provided. Moreover, a gap between the longitudinal rib and corresponding one of the tension rollers may be set smaller than diameter of the wires.

With the above configuration, the elliptical rib can reinforce the tensioner body, and the roller holders can be therefore stably guided. Moreover, the longitudinal rib can surely prevent the wires from entering the gap between each tension roller and the tensioner body.

A part of a drum cover covering the reel drum may abut on an outer surface of the tensioner cover, and the drum cover, the tensioner cover, and the tensioner body may be fastened together by a fastening unit.

With the above configuration, it is possible to reduce man-hours required to mount the tensioner case and drum cover to the board.

A holding member holding portions of the wires which begin to be unwound may be provided in the tensioner case in the vicinity of the outer circumferential surface of the reel drum.

With the above configuration, during arrangement of part of each wire other than the wound portion, the portion of the wire beginning to be unwound in the reel drum can be held by the holding member, thus improving the workability. In addition, during operation, it is possible to prevent the portion of the wire beginning to be unwound from being raised from the outer circumference of the reel drum, thus effectively preventing the wires from being disengaged from the reel drum.

The biasing unit may be a torsion spring, and the torsion spring includes a winding portion formed of a wire material wound and a pair of wire end extended portions extending outward from the winding portion. The winding portion may be rotatably supported at a middle position between the roller holders in the tensioner case, and the both wire end extended portions may be brought into contact with the respective roller holders in substantially a same direction.

With the above configuration, two tension rollers can be efficiently biased by the single torsion spring, thus reducing the number of parts and reducing rotation resistance of the reel drum. Specifically, when the reel drum is rotated in any direction, the wound one of the wires, which are wound onto the reel drum in directions opposite to each other, is tensioned, and the other unwound wire is loosened. The tension roller on the unwound wire's side is pressed and moved by one of the wire end extended portions of the torsion spring, and the torsion spring is then restored. Accordingly, the biasing force of the wire end extended portion to bias the other wound wire is reduced, thus reducing the rotation resistance. The reduction of the rotation resistance of the reel drum reduces load on the means of driving the reel drum. Accordingly, the driving means rotating the reel drum, such as a motor, can be a small type with small output, and size and weight of the entire wire reciprocating device can be reduced.

The biasing unit may be a torsion spring, and the torsion spring includes a winding portion formed of a wire material wound and a pair of wire end extended portions extending outward from the winding portion. At least one of the paired wire end extended portions is brought into contact with corresponding one of the roller holders provided in the tensioner case to be allowed to move in a rotation range thereof, and the other wire end extended portion is brought into contact with the other roller holder provided in the tensioner case to be allowed to move in the rotation range thereof or is brought into contact with a part of the tensioner case. The both roller holders or the former roller holder is biased in one direction by a torsional restoring force of the winding portion, and a contact portion of the roller holder which the wire terminal extension portion is brought into contact with has an angle shape with a ridge aligned in a direction orthogonal to the wire end extended portion.

With the above configuration, the contact portion in each roller holder which the corresponding wire end extended portion is brought into contact with has an angle shape with the ridge aligned in the direction orthogonal to the wire end extended portion of the torsion spring. Accordingly, the wire end extended portion is always in contact with the ridge, and the contact point in each roller holder changes a little. The biasing force of the torsion spring can therefore act on the roller holders substantially uniformly, stably, and smoothly.

The contact portions may have a groove shape with a center part recessed viewed in the axis directions of the respective wire end extended portions.

With the above configuration, each wire end extended portion of the torsion spring is always held in the center of the contact portion of the corresponding roller holder as the moving body. Accordingly, the biasing force of the torsion spring can act on the moving body in a balanced and smooth manner.

The contact portions may have a V-groove shape with a center part recessed viewed in the axis directions of the wire end extended portions.

With the above configuration, even when each wire end extended portion of the torsion spring is shifted from the center of the contact portion of the corresponding roller holder as the moving body toward the sides, the wire end extended portion is biased onto the contact portion of the moving body by the biasing force of the torsion spring and is therefore automatically pressed toward the center along the V-groove shaped ridge. In other words, an automatic centering effect can be provided.

Proximal portions of the both wire end extended portions may be bent with respect to the winding portion such that distal end portions of the both wire end extended portions are positioned in a same plane.

With the above configuration, the distal end portions of the both wire end extended portions of the torsion spring are positioned in the same plane. Accordingly, torsion or disproportionate load does not act on the roller holders as the moving bodies, and the biasing force of the torsion spring can act on the moving bodies in a balanced and smooth manner.

The proximal portions of the both wire end extended portions may be bent with respect to the winding portion such that the distal end portions of the both wire end extended portions are positioned in a same plane extending from the center of the winding portion in a direction orthogonal to a center axis of the winding portion.

With the above configuration, the distal end portions of the both wire end extended portions are positioned in the plane extending from the center of the winding portion in a direction orthogonal to the center axis of the winding portion. Accordingly, torsion or disproportionate load does not act on the roller holders as the moving bodies, and the biasing force of the torsion spring can act on the moving bodies in a balanced and smooth manner.

BRIEF DESCRIPTION OF THE DRAWINGS

FIG. 2 is a perspective view showing a left side of a vehicle a sliding door of which a wire reciprocating device according to an embodiment of the present invention is applied to.

DESCRIPTION OF THE PREFERRED EMBODIMENT

Figure 1A:
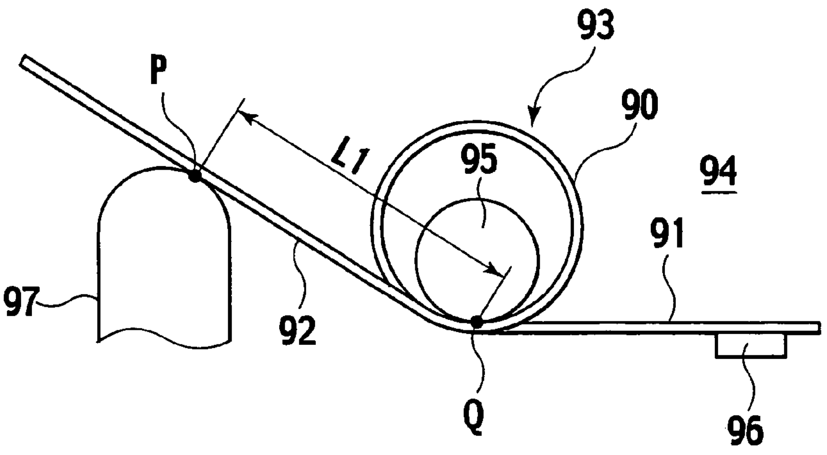
FIG.1A PRIOR ART
FIGS. 1A to 1C are operation explanatory views showing three modes of a conventional structure to bias a moving body by means of a torsion spring when the moving body moves.

Next, a description is given of an embodiment of the present invention based on the drawings. In the following description of the drawings, same or similar members are given same or similar reference numerals.

Figure 2:
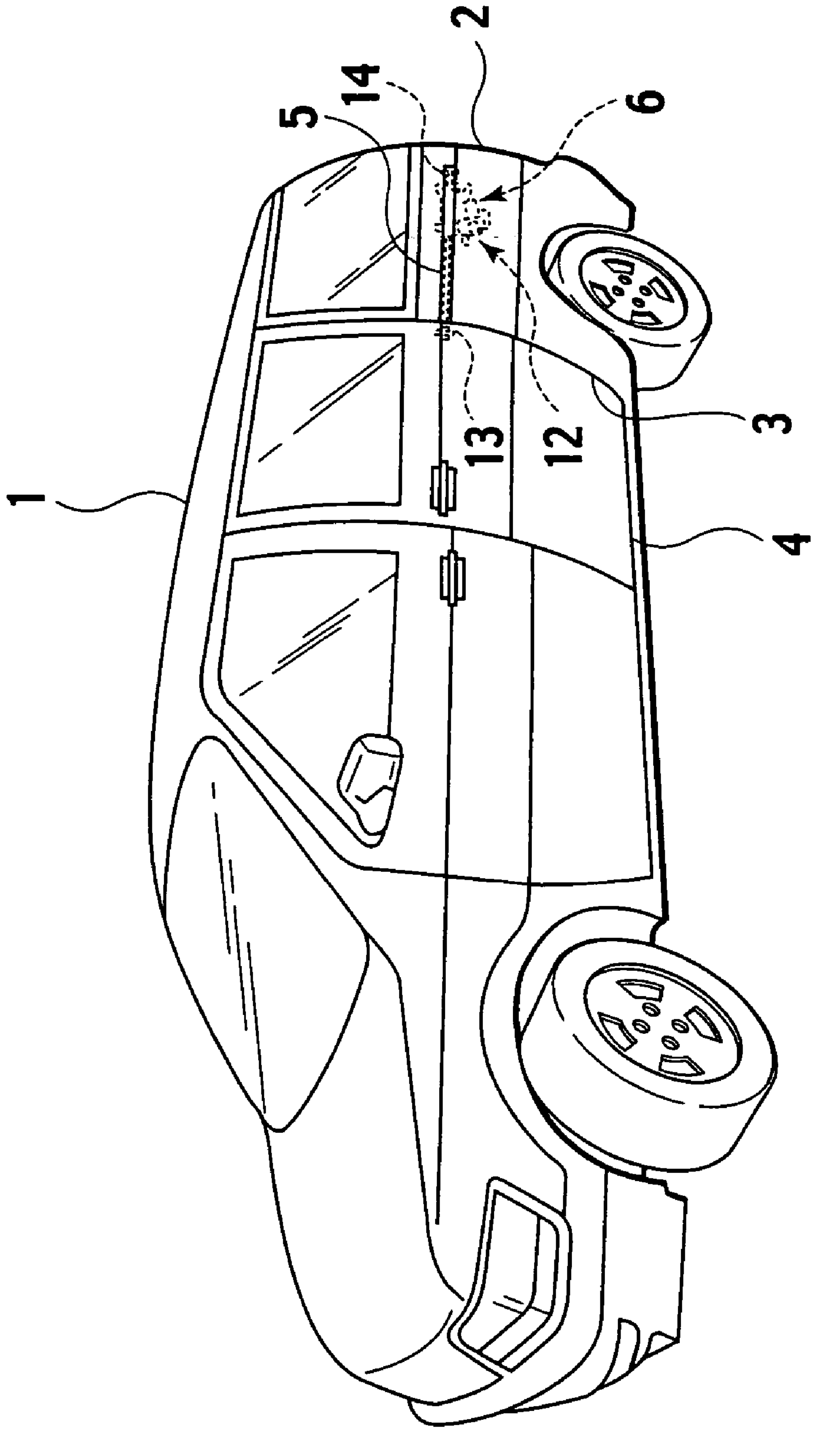

FIG. 2 is a perspective view showing a left side of a vehicle a sliding door of which a wire reciprocating device as the embodiment of the present invention is applied to. A sliding door in the right side of a vehicle body is opened and closed with a structure symmetrical to the above structure, and drawings and a detailed description thereof are omitted.

As shown in FIG. 2, a sliding door 4 opens and closes an opening 3 provided in the middle of a side panel 2 of a vehicle body 1. The sliding door 4 is guided by an upper rail (not shown) provided in an upper edge of the opening 3 in the side panel 2, a lower rail (not shown) provided in a lower edge of the same, and a waist rail 5 provided in a rear middle portion of the side panel 2 and extended forward and backward ("forward" is left in FIG. 2). The sliding door 4 can be moved between a full closed position shown in FIG. 2 where the sliding door 4 closes the opening 3 and a full open position (not shown) by an opening/closing device 6. The sliding door 4 moves backward along the side panel 2 a little outside of an outer side surface of the side panel 2 and reaches the full open position.

Figure 3:
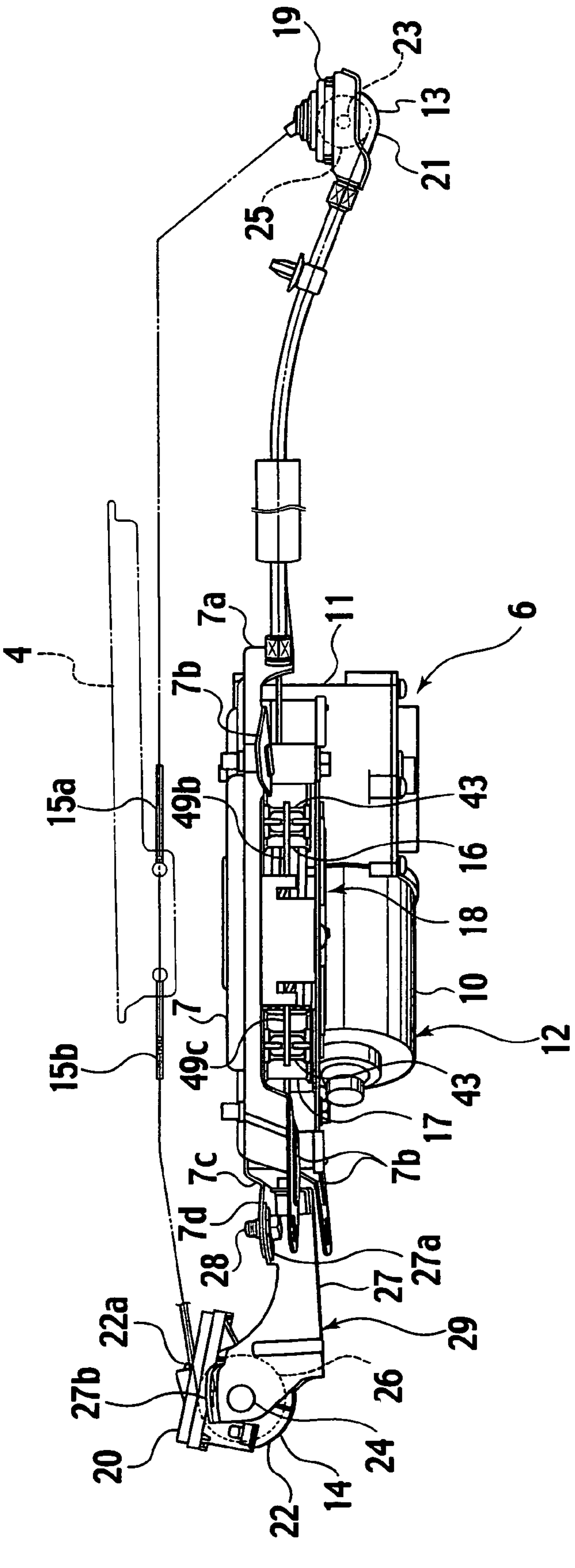
FIG. 3 is a plan view of the wire reciprocating device according to the embodiment of the present invention.
Figure 4:
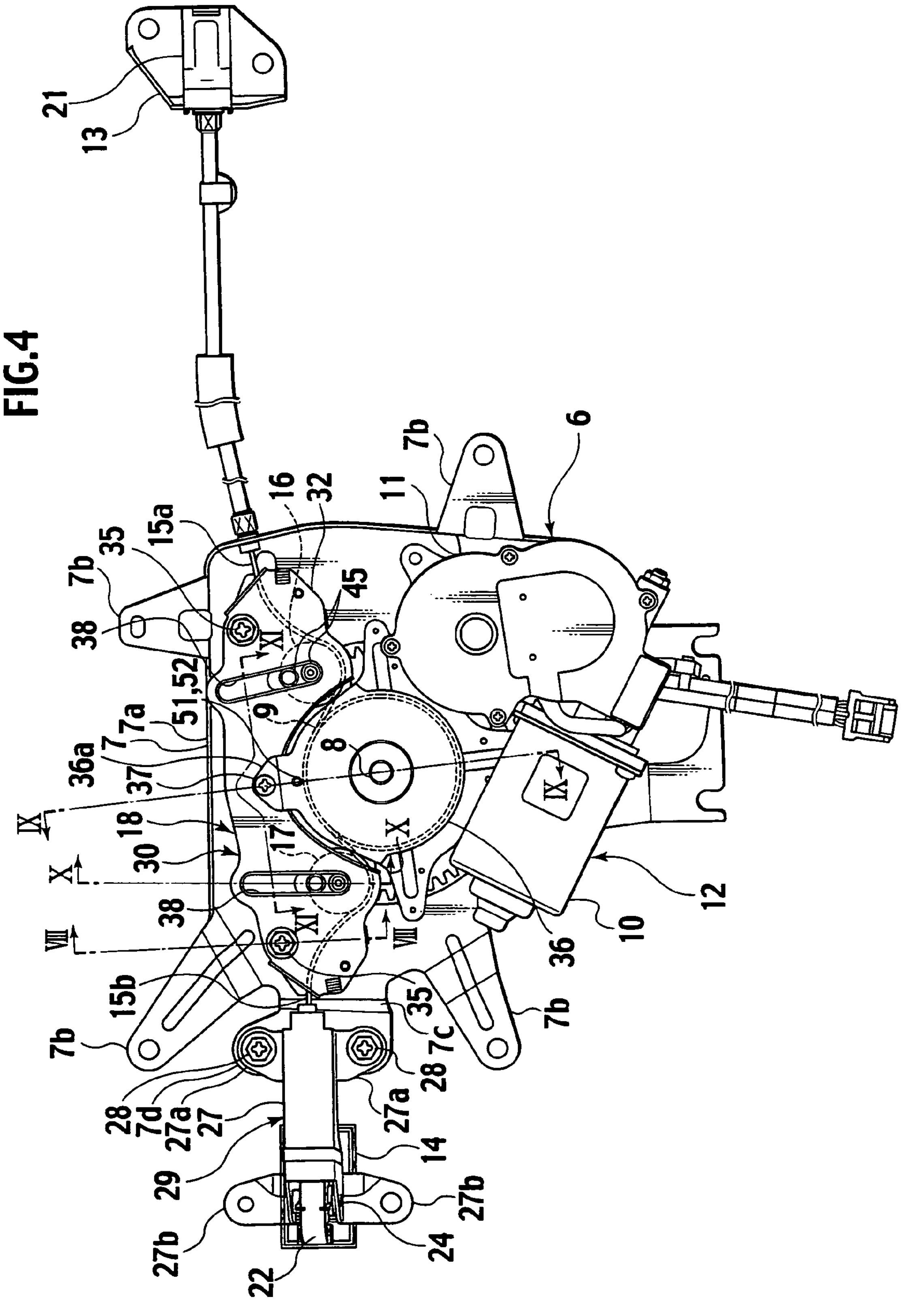
FIG. 4 is a side view of the wire reciprocating device according to the embodiment of the present invention, viewed from the inside of the vehicle.

FIG. 3 is a plan view of the opening/closing device 6, and FIG. 4 is a side view of the opening/closing device 6 viewed from the inside of the vehicle. The right in FIGS. 3 and 4 is the front; and the upper and lower sides of FIG. 3 are the outside and inside of the vehicle, respectively.

As shown in FIGS. 2 to 4, the opening/closing device 6 includes a drive unit 12, a pair of guide members 13 and 14, a door closing wire 15*a* composed of a wire, cable, or the like, and a door opening wire 15*b* similarly composed. The drive unit 12 rotates a reel drum 9 by means of a reversible motor 10 through a reduction mechanism 11 in an opening direction as a clockwise direction in FIG. 4 and a closing direction as a counterclockwise direction in FIG. 4. The reel drum 9 is rotatably supported on a board 7 by a shaft 8 laterally extending. The board 7 is fixed to a surface of the side panel 2 on the inside of the vehicle. The motor 10 is provided on the board 7. The paired guide members 13 and 14 are provided in front and rear portions of the waist rail 5 in the side panel 2. The wire 15*a* has one end connected to an inner surface of the sliding door 4 and extends forward to be wound around the front guide member 13 substantially in a U-shape in a plan view. The other end portion of the wire 15*a* is wound counterclockwise onto the reel drum 9 from an upper portion thereof, and the end thereof is finally connected to the reel drum 9. The wire 15*b* has one end connected to the inner surface of the sliding door 4 and extends backward to be wound around the rear guide member 14 substantially in a U-shape in a plan view. The other end portion of the wire 15*b* is wound clockwise onto the reel drum 9 from an upper portion thereof, and the end thereof is finally connected to the reel drum 9.

The wires 15*a* and 15*b* may be one continuous wire. In this case, a middle portion of the wire or both ends of the wire are connected to the sliding door 4. The wires 15*a* and 15*b* may also be implemented by increasing the winding numbers thereof so as not to be misaligned from the reel drum 9.

In this embodiment, the opening/closing device 6 constitutes the wire reciprocating device of the present invention which rotationally runs and reciprocates the wires 15*a* and 15*b* to reciprocate the sliding door 4 as a moving member connected to the wires 15*a* and 15*b*.

Above the reel drum 9, a tensioner 18 as a wire's sag prevention device is provided. The tensioner 18 presses tension rollers 16 and 17 onto the wires 15*a* and 15*b*, respectively, to prevent the wires 15*a* and 15*b* from sagging. The tensioner 18 includes a structure to bias the moving member using a torsion coil.

Before a detailed description of the configuration of the tensioner 18, the other configurations of the opening/closing device 6 and the entire operation of the opening/closing device 6 are briefly described. The guide members 13 and 14 include pulley holders 21 and 22 and guide pulleys 25 and 26, respectively. The pulley holders 21 and 22 are provided on the side panel 2 with packings 19 and 20 interposed therebetween, respectively. The guide pulleys 25 and 26 are rotatably supported on the pulley holders 21 and 22 by shafts 23 and 24 vertically extending, respectively. The wires 15*a* and 15*b* are wound around substantially half of the guide pulleys 25 and 26, respectively.

On the periphery of the board 7, a peripheral portion 7*a* extending toward the inside of the vehicle is formed. At a plurality of places of the peripheral portion 7*a*, attachment pieces 7*b* for screwing the board 7 onto the surface of the side panel 2 on the inside of the vehicle are provided. In this embodiment, the side panel 2 has a double wall structure which includes a hollow portion formed between an outer panel (not shown) on the outside of the vehicle and an inner panel (not shown) on the inside of the vehicle.

Between the upper and lower attachment pieces 7*b* and 7*b* in a rear end portion of the board 7, a bracket attachment piece 7*d* extending backward is provided with a flexible portion 7*c* interposed therebetween. The flexible portion 7*c* extends toward the inside of the vehicle on a slight slope to the rear. To the bracket attachment piece 7*d*, attachment pieces 27*a* and 27*a* formed in upper and lower front potions of a bracket 27 are fixed by setscrews 28 and 28. The bracket 27 is U-shaped in the front view and extends in the front-back direction.

In the rear end portion of the bracket 27, the pulley holder 22 in the rear guide member 14 is rotatably supported by the shaft 24 of the guide pulley 26.

The attachment pieces 27*b* and 27*b* formed in the upper and lower rear end portions of the bracket 27 are abut on the surface of the outer panel on the inside of the vehicle and screwed in such a manner that an outside outlet 22*a* for the wire 15*b* of the pulley holder 22 in the guide member 14 faces an opening (not shown) provided for the outer panel of the side panel 2 and the pulley holder 22 is pressed onto the surface of the outer panel on the inside of the vehicle through the packing 20. The rear guide member 14 can be thus easily and surely attached to the side panel 2.

Moreover, even if the positional relationship between the board 7 attached to the inner panel (not shown) of the side panel 2 and the opening of the outer panel somewhat varies, the flexible portion 7*c* of the board 7 is deformed, and the bracket attachment piece 7*d* extending backward from the flexible portion 7*c* and an extended portion 29 formed of the bracket 27 are slightly tilted up and down and from side to side, thus absorbing the variation. In any cases, therefore, the rear guide member 14 can be easily and surely attached to a proper position of the side panel 2.

Next, a description is given of an operation of the opening/closing device 6.

In a door closed state shown in FIG. 2, when a not-shown door opening operation switch provided on the inside or outside of the vehicle is operated, the motor 10 is rotated forward. The reel drum 9 is then rotated through the reduction mechanism 11 in an open direction, which is the clockwise direction in FIG. 4. The rear wire 15*b* is therefore wound onto the reel drum 9, and the front wire 15*a* is unwound from the reel drum 9. The sliding door 4 fixed to the both wires 15*a* and 15*b* is thus moved backward.

When the sliding door 4 reaches the predetermined full open position, a full open detection sensor, a drawing and a description thereof are omitted, operates to stop the forward rotation of the motor 10, and the sliding door 4 is held at the full open position.

When a not-shown door close operation switch provided on the inside or outside of the vehicle is operated in a state where the sliding door 4 stops at the full-open position or a certain intermediate position between the full-open position and full-close position, the motor 10 is rotated in reverse. The reel drum 9 is therefore rotated through the reduction mechanism 11 in the close direction, which is the counterclockwise direction in FIG. 4. By the rotation of the reel drum 9 in the close direction, the front wire 15*a* is wound onto the reel drum 9, and the rear wire 15*b* is unwound from the reel drum 9. The sliding door 4 connected to the both wires 15*a* and 15*b* is thus moved forward.

When the sliding door 4 reaches the full close position, the sliding door 4 is engaged at the full close position by a door latch, a drawing and a description of which are omitted. In addition, a full close detection sensor operates to stop the reverse rotation of the motor 10, and the sliding door 4 is held at the full close position.

Next, a description is given of the tensioner 18 in detail with reference to FIGS. 4 to 12.

Figure 5:
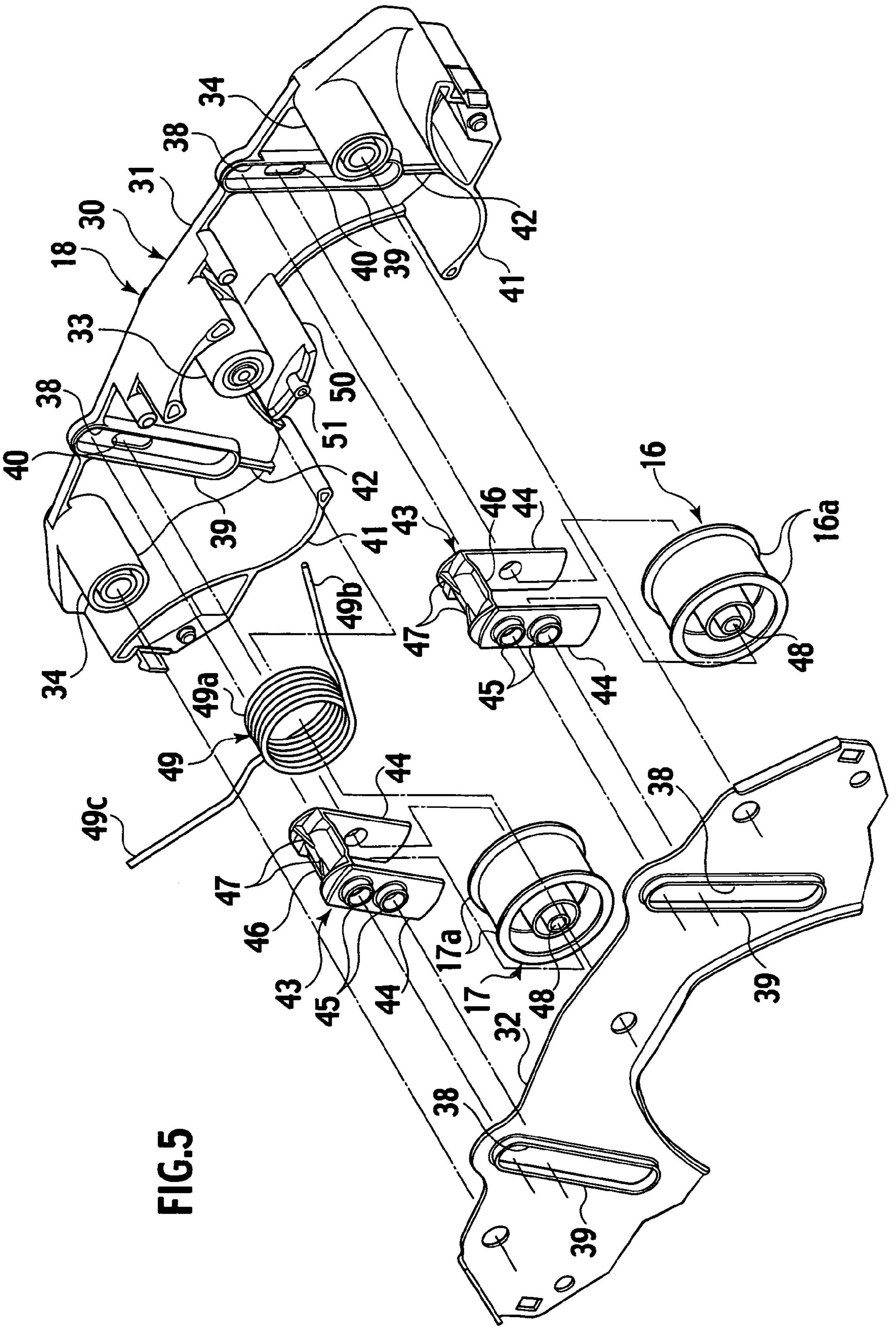
FIG. 5 is an exploded perspective view of a tensioner of the wire reciprocating device according to the embodiment of the present invention.
Figure 6:
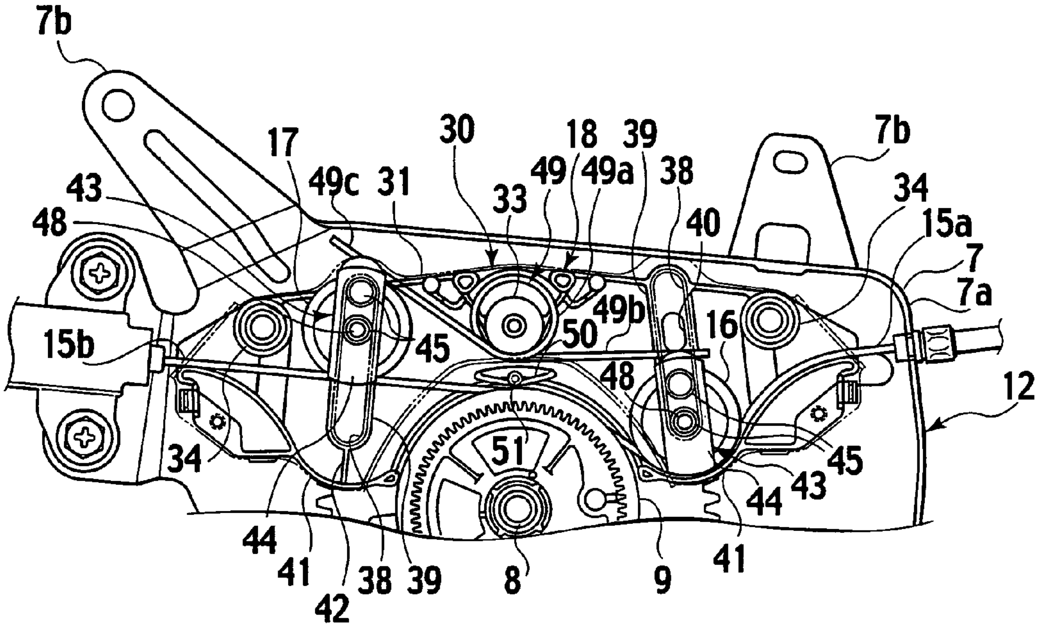
FIG. 6 is a side view showing a state of the tensioner of the wire reciprocating device according to the embodiment of the present invention in a door opening operation, with a tensioner cover removed.
Figure 7:
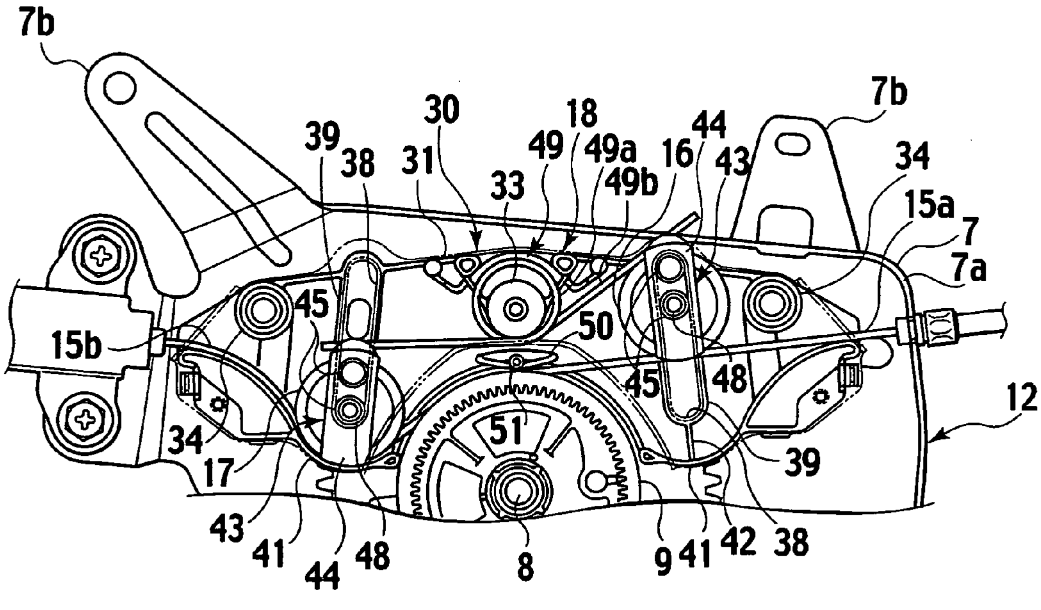
FIG. 7 is a side view showing a state of the tensioner of the wire reciprocating device according to the embodiment of the present invention in a door closing operation, with a tensioner cover removed.
Figure 8:
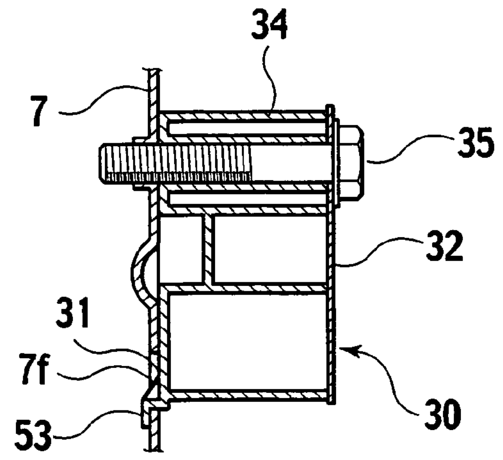
FIG. 8 is a partial enlarged cross sectional view of the wire reciprocating device according to the embodiment of the present invention along a line VIII-VIII of FIG. 4.
Figure 9:
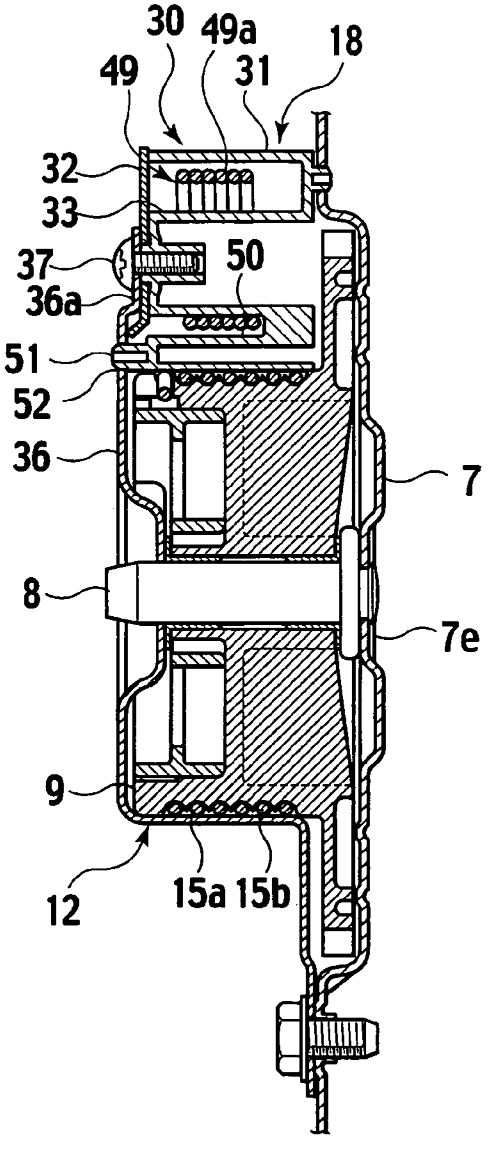
FIG. 9 is a partial enlarged cross sectional view of the wire reciprocating device according to the embodiment of the present invention along a line IX-IX of FIG. 4.

FIG. 5 is an exploded perspective view of the tensioner 18; FIG. 6 is a side view showing a state of the tensioner 18 during the door opening operation, with a tensioner cover removed; FIG. 7 is a side vide showing a state of the tensioner 18 during the door closing operation, with-the tensioner cover removed; and FIGS. 8 to 11 are cross sectional views along lines VIII-VIII, IX-IX, X-X, and XI-XI in FIG. 4, respectively. FIGS. 12A to 12C are operation explanatory views showing three modes while roller holders move.

As shown in FIGS. 4 to 11, especially as clearly shown in FIG. 5, the tensioner 18 includes a tensioner case 30. The tensioner case 30 is detachably provided on the board 7, which rotatably supports the reel drum 9, in the vicinity of the upper part of the reel drum 9.

The tensioner case 30 includes a tensioner body 31 and a tensioner cover 32, which extend forward and backward so as to cover the space above the reel drum 9 and are opposite to each other.

In the center and both front and rear portions of the tensioner body 31, boss portions 33, 34, and 34 extending toward the tensioner cover 32 are provided. The tensioner cover 32, tensioner body 31, and board 7 are fastened with each other with top ends of the boss portions 33, 34, and 34 abutting on an inner surface of the tensioner cover 32 by means of bolts 35, which penetrate the front and rear boss portions 34 and 34, tensioner body 31, and board 7 (see FIGS. 4 and 8).

The center portion of the tensioner cover 32 and an attachment piece 36*a* in an upper portion of a drum cover 36 covering the reel drum 9 are fastened together onto the top end of the center boss portion 33 by means of a bolt 37 (see FIGS. 4 and 9) The attachment piece 36*a* abuts on the outer surface of the tensioner cover 32.

As shown in FIG. 5, in both sides of the tensioner body 31 and tensioner cover 32, guide grooves 38 and 38 are individually provided. The guide grooves 38 and 38 extend in directions substantially orthogonal to the tensioned wires 15*a* and 15*b* extending forward and backward from the reel drum 9.

The guide grooves 38 and 38 on the tensioner body 31 side are formed inside of the tensioner body 31 by providing elliptical ribs 39 on the inner surface of the tensioner body 31. Each of the elliptical rib 39 has a long axis aligned in a direction substantially orthogonal to the tensioned wire 15*a* or 15*b* and protrudes toward the inside of the vehicle.

The guide grooves 38 and 38 on the tensioner cover 32 side are formed by providing elliptical holes in respective both side portions of the tensioner cover 32 and providing elliptical ribs 39 in the periphery of the elliptical hole. Each of the elliptical holes has a long axis aligned in a direction substantially orthogonal to the tensioned wire 15*a* or 15*b*. The elliptical ribs 39 protrude toward the inside of the vehicle.

In an inner upper portion of each guide groove 38 in the tensioner body 31, a working hole 40 is provided. This working hole 40 is to temporarily hold each of the tension rollers 16 and 17 at an upper portion of the guide groove 38 by means of a jig (not-shown) inserted into the same. This is because connecting the ends of the wires 15*a* and 15*b* to the sliding door 4 is difficult if the tension rollers 16 and 17 are given biasing force of the torsion spring 49 as biasing means.

In lower edges of front and rear portions of the tensioner body 31, bottom pieces 41 and 41 extending toward the tensioner cover 32. The bottom pieces 41 and 41 receive wires 15*a* and 15*b* extending from the reel drum 9 forward and backward in a state where the wires 15*a* and 15*b* sag to the maximum extent (state where the wires 15*a* and 15*b* are given the biasing force by the biasing means).

Figure 10:
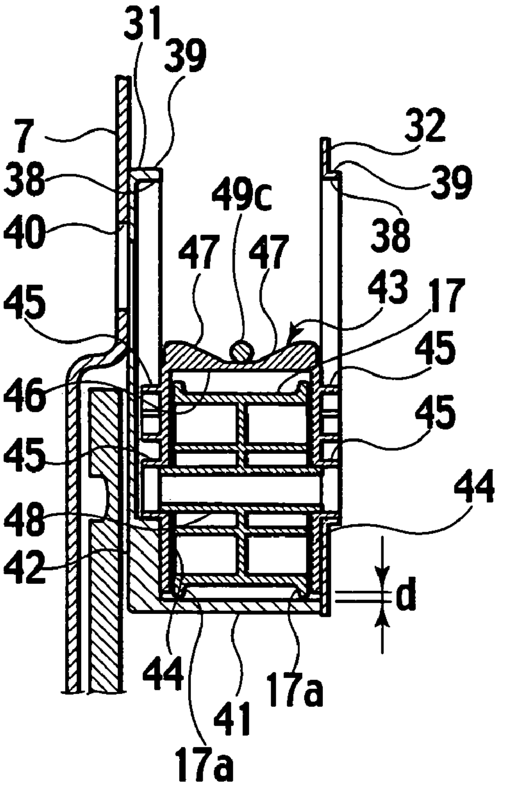
FIG. 10 is a partial enlarged cross sectional view of the wire reciprocating device according to the embodiment of the present invention along a line X-X of FIG. 4.

In the inner surface of the tension body 31, longitudinal ribs 42 are individually provided from lower ends of the elliptical ribs 39 to the bottom pieces 41 and 41. As shown in FIG. 10, gaps between the tension rollers 16 and 17 and the respective longitudinal ribs 42 are set smaller than the diameters of the wires 15*a* and 15*b*, which surely prevents the wires 15*a* and 15*b* from entering the gaps between the tension rollers 16 and 17 and the tensioner body 31.

In the guide grooves 38 and 38 of the tensioner body 31 and tensioner cover 32 opposite to each other, a roller holder 43 is provided. The roller holder 43 is U-shaped downwardly open in the front view. Pairs of upper and lower bosses 45 and 45 as protrusions are fitted into the respective guide grooves 38 and 38 so as to substantially vertically slide. The upper and lower bosses 45 are provided in outer side surfaces of both side pieces 44 and 44 of the roller holder 43. The roller holder 43 is the moving member in the torsion spring.

The upper surface of a connection piece 46 connecting upper end portions of the both side pieces 44 and 44 of each roller holder 43 forms a spring contact portion with which each of wire end extended portions 49*b* and 49*c* of a later-described torsion spring 49 is brought into contact. The roller holders 43 have angle shapes with ridges aligned in directions orthogonal to the wire end extended portions 49*b* and 49*c*. In a ridge portion in the upper surface of each connection piece 46 as the spring contact portion, a pair of triangular ribs 47 and 47 is provided. The triangular ribs 47 and 47 have upper edges sloped down toward the center of the connection piece 46. Viewed in the front-back direction, specifically, viewed in directions of axes of the wire end extended portions 49*b* and 49*c*, the ridge portion is shaped in a V-groove with the center portion recessed (see FIG. 10).

The tension rollers 16 and 17 are rotatably fitted in the respective roller holders 43 by means of the shafts 48 each penetrating the lower bosses 45 and 45 of the both side pieces 44 and 44.

As shown in FIGS. 5 and 10, an end portion of each bottom piece 41 on the reel drum 9 side is set in the vicinity of the outer circumferential surface of the reel drum 9. In addition, gaps d are set smaller than the diameters of the wires 15*a* and 15*b*. Herein, the gaps d are gaps between the bottom pieces 41 and outer circumferences of collar portions 16*a*, 16*b*, 17*a*, and 17*b* (see FIG. 5) at both edges of the tension rollers 16 and 17 when the roller holders 43 reach the lowest positions of the respective guide grooves 38 and 38 extending in the substantially vertical direction. This prevents the wires 15*a* and 15*b* even when wires 15*a* and 15*b* abnormally loosened from dropping from the tension rollers 16 and 17.

On the outside of the center boss portion 33 of the tensioner body 31, a winding portion 49*a* of the torsion spring 49 is rotatably fitted. The torsion spring is the biasing means for simultaneously biasing the tension rollers 16 and 17. The winding portion 49*a* is formed of a wire material wound. The wire end extended portions 49*b* and 49*c* extending from the winding portion 49*a* toward both front and rear sides are brought into contact with the centers of the upper surfaces of the connection pieces 46 of the respective front and rear roller holders 43 and 43 from above.

As described above, the upper surface of each connection piece 46 has an angle shape with the ridge aligned in a direction orthogonal to the wire end extended portion 49*b* or 49*c*. As shown in FIG. 12A to 12C, the wire end extended portions 49*b* and 49*c* are always in contact with the top of the angle shape, and the points at which the wire end extended portions 49*b* and 49*c* are in contact with the respective roller holders 43 move a little. The biasing force of the torsion spring 49 therefore acts on the roller holders 43 as the moving bodies substantially uniformly, stably, and smoothly.

Moreover, in the angle-shaped spring contact portion, which is the upper surface of each connection piece 46, the ridge thereof has a V-groove shape with the center portion recessed when viewed in the axis direction of the wire end extended portions 49*b* or 49*c* as shown in FIG. 10. Even if the wire end extended portions 49*b* and 49*c* are shifted from the center to the side of the spring contact portion, the wire end extended portions 49*b* and 49*c* are biased downward by the biasing force of the torsion spring 49 and thereby automatically pressed along the V-groove shaped ridge to the center. In other words, it is possible to provide a self centering effect.

Figure 11:
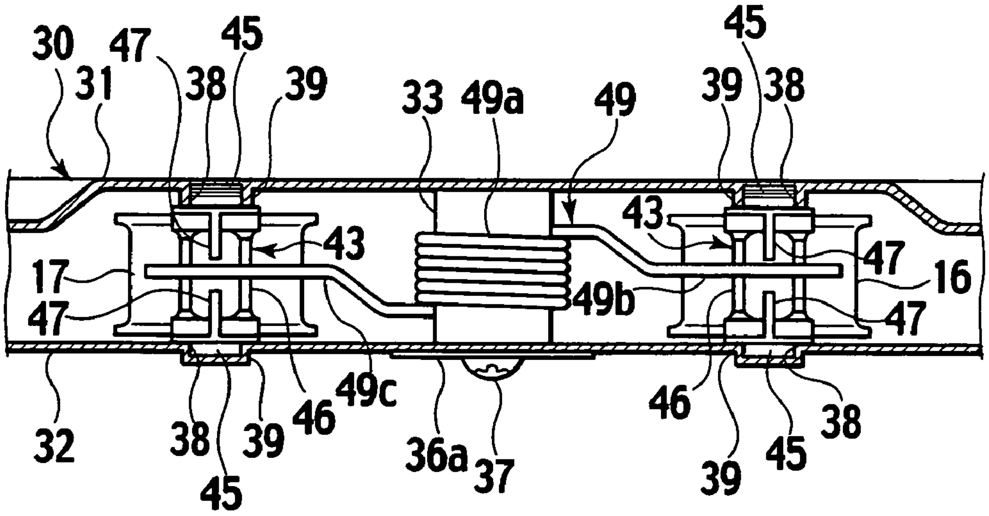
FIG. 11 is a partial enlarged cross sectional view of the wire reciprocating device according to the embodiment of the present invention along a line XI-XI of FIG. 4.
Figure 12A:
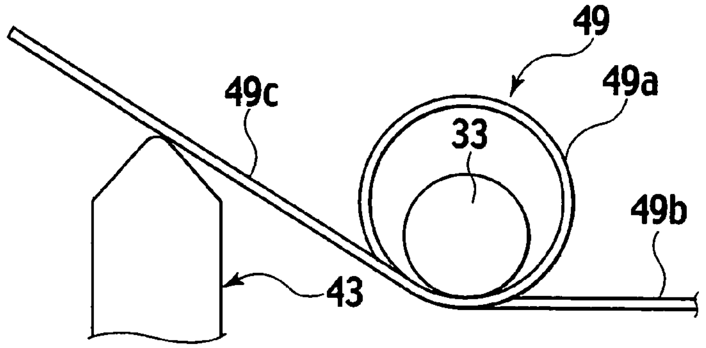
FIGS. 12A to 12C are operation explanatory views showing three modes of the wire reciprocating device according to the embodiment of the present invention when a roller holder moves.
Figure 12B:
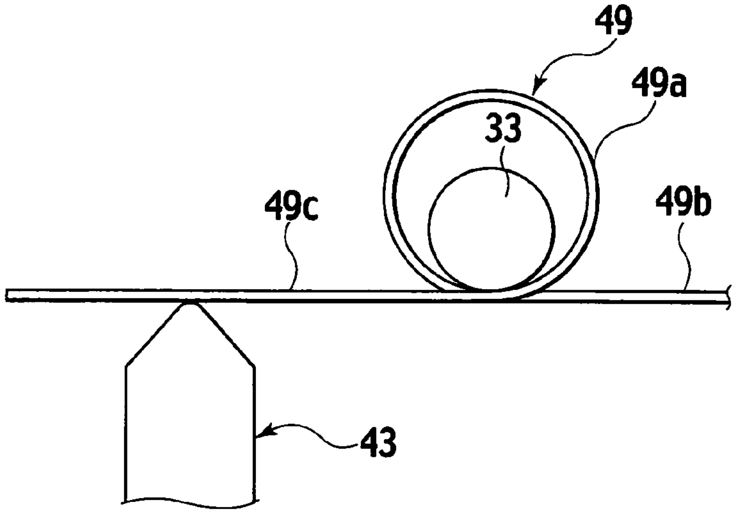
Figure 12C:
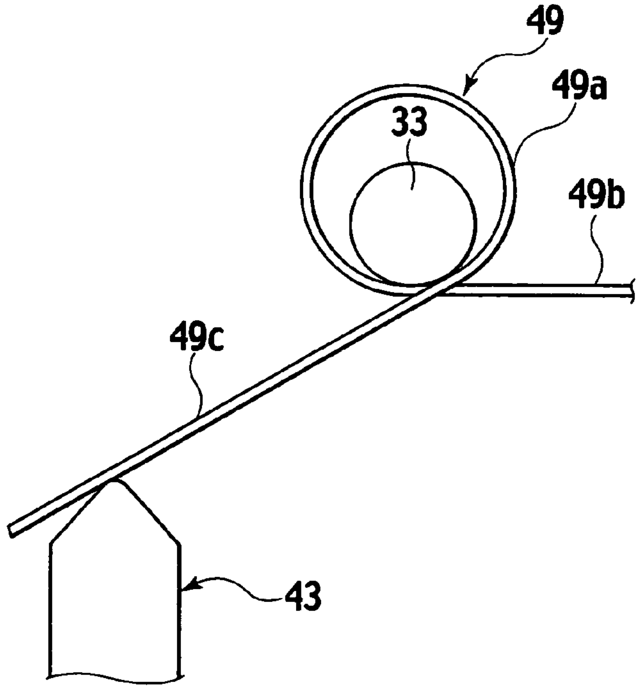

As shown in FIG. 11, proximal portions of the both wire end extended portions 49*b* and 49*c* are bent to gradually approach from outer ends of the winding portion 49*a* to the center such that the end portions of the both wire end extended portions 49*b* and 49*c* are positioned in a plane extending from the center of the winding portion 49*a* in a direction orthogonal to the center axis of the winding portion 49*a*.

Moreover, distances from the center boss portion 33 to the front and rear guide grooves 38 and 38 in the tensioner body 31 are designed to be substantially equal to each other, and lengths of portions of the both wire end extended portions 49*b* and 49*c* between the winding portion 49*a* and the points at which the wire end extended portions 49*a* and 49*c* are in contact with the respective roller holders 43 are designed to be substantially equal to each other.

Such a configuration enables the biasing force of the torsion spring 49 to stably act on the both tension rollers 16 and 17 from the wire end extended portions 49*b* and 49*c* through the roller holders 43 and bias the tension rollers 16 and 17 downward in a balanced manner.

As shown in FIGS. 4 to 7 and FIG. 9, a holding member 50 is integrally formed in the inner surface of the tensioner body 31 just above the reel drum 9 so as to be close to the outer circumferential surface of the reel drum 9. The holding member 50 holds portions of the both wires 15*a* and 15*b* which begin to be unwound. The lower surface of the holding member 50 is a curved surface convex in the side view.

In the top end face of the holding member 50, a protrusion 51 is provided. The protrusion is fitted into an engagement hole 52, which is provided in the attachment piece 36*a* in the upper portion of the drum cover 36, and the holding member 50 can be therefore stably supported at both ends.

Positioning of the reel drum 9 and the tensioner case 30 is achieved by fitting the shaft 8 of the reel drum 9 into the hole 7*e* provided for the board 7 (see FIG. 9), fitting the protrusion 53 provided for the tensioner body 31 into a hole 7*f* provided for the board 7 (see FIG. 8), and furthermore fitting the protrusion 51 of the holding member 50 into the engagement hole 52 provided for the attachment piece 36 in an upper portion of the drum cover 36. The engagement hole 52 is an elliptical hole slightly long in the vertical direction.

The holding member 50 may be rotatably supported between the tensioner body 31 and the tensioner cover 32 or drum cover 36 by a shaft laterally extending.

Since the tensioner 18 is configured as described above, in the door opening operation, as shown in FIG. 6, the door opening wire 15*b* is tensioned by the clockwise rotation of the reel drum 9, and the rear tension roller 17 is thereby raised against the biasing force of the torsion spring 49. On the contrary, the door closing wire 15*a* unwound from the reel drum 9 sags, and the front tension roller 16 is pressed down by the biasing force of the torsion spring 49.

In the door closing operation, as shown in FIG. 7, the door closing wire 15*a* is tensioned by the counterclockwise rotation of the reel drum 9, and the front tension roller 16 is thereby raised against the biasing force of the torsion spring 49. On the contrary, the door opening wire 15*b* unwound from the reel drum 9 sags, and the rear tension roller 17 is pressed down by the biasing force of the torsion spring 49.

As apparent from a comparison between FIGS. 6 and 7, in the door opening operation and door closing operation, the vertical positions of the front and rear tension roller 16 and 17 alternately change, but the angle between the both wire end extended portions 49*b* and 49*c* in the torsion spring 49 changes a little. The biasing force of the tension rollers 16 and 17 applied to the wires 15*a* and 15*b* can be therefore maintained to be substantially equal through the door opening operation and door closing operation.

As apparent from the above description, according to the embodiment of the present invention, only attaching the board 7 to the tensioner case 30 previously assembled with the biasing means composed of the pair of tensioner rollers 16 and 17 and torsion spring allows easy attachment of the pair of tension rollers 16 and 17 to positions optimal for the reel drum 9, thus facilitating the assembly work. In addition, it is possible to prevent variations in positions where the tension rollers 16 and 17 are mounted and therefore apply stable tension to the wires 15*a* and 15*b*.

Moreover, the portions of the roller holders 43 as the moving bodies which the wire end extended portions 49*b* and 49*c* are in contact with are configured to have angle shape with the ridges aligned in the directions orthogonal to the wire end extended portions 49*b* or 49*c*, respectively. Accordingly, the wire end extended portions 49*b* and 49*c* are always in contact with the ridges, and the contact points change a little. The biasing force of the torsion spring can therefore act on the roller holders 43 substantially uniformly, stably, and smoothly.

As described above, the present invention is described by the embodiment, but the present invention is not limited to this. The configuration of each member can be replaced with an arbitrary configuration with a similar function.

Figure 1B:
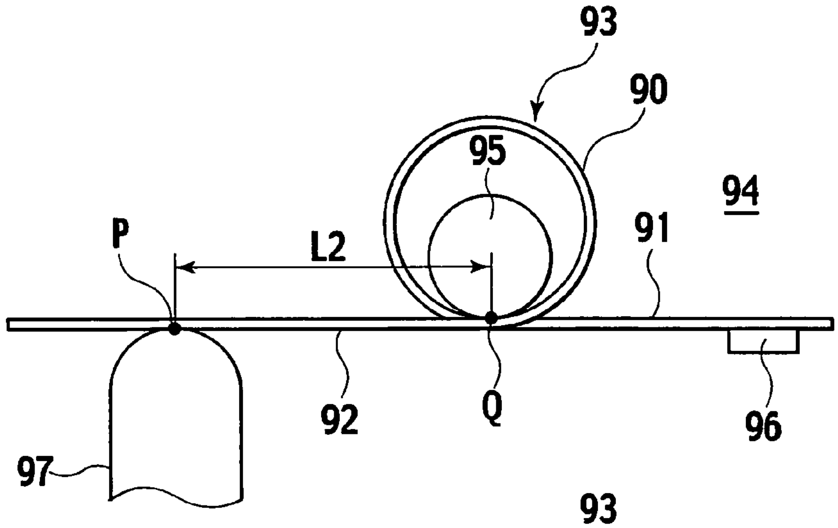
FIG.1B PRIOR ART
Figure 1C:
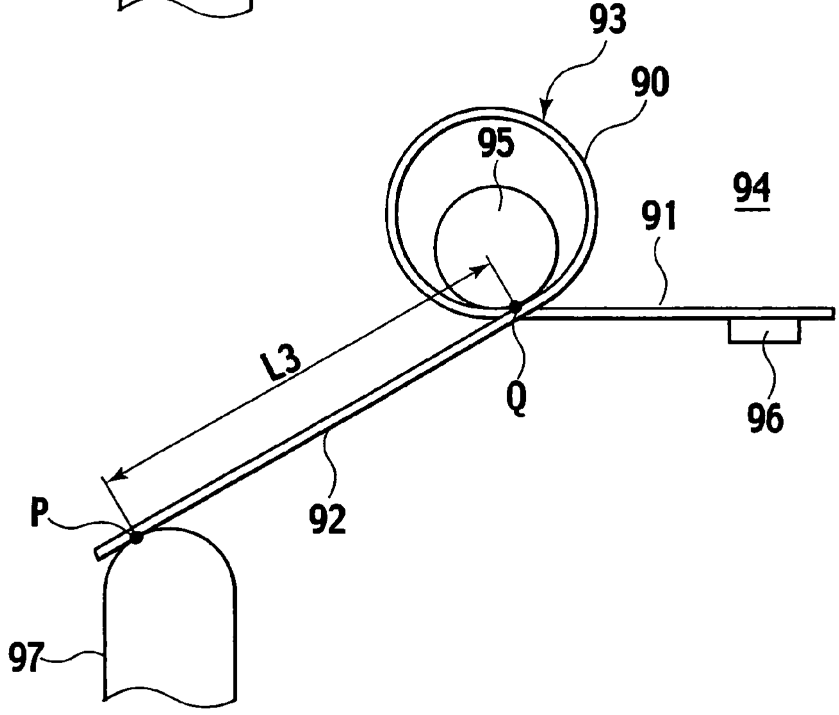
FIG.1C PRIOR ART

For example, the biasing means, similar to the conventional structure to bias the moving body by the torsion spring as shown in FIG. 1, may be configured such that any one of the wire end extended portions 49*b* and 49*c* is in contact with a protrusion piece (not shown) protruded in the tensioner body 31 as a fixed body and the roller holder 43 as the moving body is biased by only the other wire extension portion.

The present invention can be applied to, not only the opening/closing device for the sliding door of the vehicle, but also to all types of wire reciprocating devices in which both end portions of a wire are wound onto a reel drum in opposite directions and the wire is reciprocated by rotation of the reel drum, thus reciprocating the moving body fixed to the wire.

As described above, it should be understood that the present invention includes various embodiments not described here.

What is claimed is:

1. A wire reciprocating device, comprising:

a pair of guide members;

a reel drum provided between the guide members;

wires wound around the guide members and connected to the reel drum to be reeled onto the reel drum in directions opposite to each other;

a moving body connected to the wires and reciprocated by rotating the reel drum in a direction and a direction opposite thereto to rotationally run and reciprocate the wires;

a pair of tension rollers pressed onto respective portions of the wires extending from the reel drum in directions opposite to each other;

roller holders rotatably supporting the respective tension rollers; and a tensioner case provided in the vicinity of the reel drum and including a biasing unit for biasing the roller holders so that the respective tension rollers are pressed onto the wires, the tensioner case allowing the tension rollers and the roller holders to move in directions substantially orthogonal to the respective wires when the wires are tensioned, wherein the tensioner case includes a tensioner body and a tensioner cover facing each other, the tensioner body and the tensioner cover include a pair of guide grooves extending in a direction substantially orthogonal to each wire when the wires are tensioned, the paired guide grooves are provided in respective portions facing each other and sandwich each tension roller and each roller holder, each of the roller holders is slidably fitted into the paired guide grooves, which allows the roller holders to slide in the direction that is substantially orthogonal to each wire when the wires are tensioned, a space between lower edges of side portions of the tensioner body and the tensioner cover on each side of the reel drum is closed by a bottom piece extending from the lower edge of the tensioner body toward the lower edge of the tensioner cover, and gaps between the bottom piece and outer circumferences of collars on both ends of each tension roller in a state where each roller holder reaches a lowest position of the pair of guide grooves extending substantially vertically are set smaller than a diameter of the wires.

2. The wire reciprocating device according to claim 1, wherein an end portion of the bottom piece on the reel drum's side is set in the vicinity of an outer circumferential surface of the reel drum.

3. The wire reciprocating device according to claim 1, wherein in a periphery of each of the guide grooves in an inner surface of the tensioner body, an elliptical rib surrounding the guide groove is protruded, a longitudinal rib reaching the bottom piece from a lower end of the elliptical rib is provided, and a gap between the longitudinal rib and corresponding one of the tension rollers is set smaller than diameter of the wires.

4. The wire reciprocating device according to claim 1, wherein a part of a drum cover covering the reel drum abuts on an outer surface of the tensioner cover, and the drum cover, the tensioner cover, and the tensioner body are fastened together by a fastening unit.

5. The wire reciprocating device according to claim 1, wherein a holding member is provided in the tensioner case in the vicinity of the outer circumferential surface of the reel drum, the holding member holding portions of the wires which begin to be unwound.

6. The wire reciprocating device according to claim 1, wherein the biasing unit is a torsion spring; and the torsion spring includes:

a winding portion formed of a wire material wound, and a pair of wire end extended portions extending outward from the winding portion; and the winding portion is rotatably supported at a middle position between the roller holders in the tensioner case; and the both wire end extended portions abut on the respective roller holders in substantially a same direction.

7. The wire reciprocating device according to claim 1, wherein the biasing unit is a torsion spring; and the torsion spring includes:

a winding portion formed of a wire material wound, and a pair of wire end extended portions extending outward from the winding portion; and at least one of the pair of wire end extended portions abuts on a corresponding one of the roller holders provided in the tensioner case to be movable in a rotation range thereof, and the other wire end extended portion abuts on the other roller holder provided in the tensioner case to be movable in the rotation range thereof or a part of the tensioner case, and both of the roller holders or the corresponding one of the roller holders on which the at least one of the pair of wire end extended portion abuts is biased in one direction by a torsional restoring force of the winding portion, and a contact portion where the wire terminal extension portion is in contact with the roller holder has an angle shape with a ridge aligned in a direction orthogonal to the wire end extended portion.

8. The wire reciprocating device according to claim 7, wherein the contact portion has a groove shape with a center part recessed viewed in an axis direction of the wire end extended portion.

9. The wire reciprocating device according to claim 8, wherein the groove shape is a V-groove shapewire end extended portion.

10. The wire reciprocating device according to claim 7, wherein proximal portions of the both wire end extended portions are bent with respect to the winding portion to locate distal end portions of the both wire end extension in a same plane.

11. The wire reciprocating device according to claim 7, wherein proximal portions of the both wire end extended portions are bent with respect to the winding portion to locate distal end portions of the both wire end extension in a same plane extending in a direction orthogonal to a center axis of the winding portion from the center of the winding portion.

* * * * *